3,398,144
SUBSTITUTED 3-AMINO-2'-HYDROXY-
ACRYLOPHENONES
Real Laliberte, Laval, Quebec, and David J. Campbell, Pincourt, Quebec, Canada, assignors to American Home Products Corporation, New York, N.Y., a corporation of Delaware
No Drawing. Filed Mar. 19, 1966, Ser. No. 538,213
6 Claims. (Cl. 260—240)

The present invention relates to 3-amino-2'-hydroxy-acrylophenones of the general Formula I

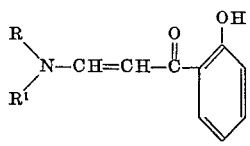

in which R represents hydrogen and R¹ represents a pyridyl or a pyridylmethyl group, or R and R¹ together represents a monocyclic heterocycle containing another hetero atom.

The compounds of this invention possess important biological properties and are valuable as medicaments. Thus, for example the compound of Formula I in which R is hydrogen and R¹ represents the 3-pyridylmethyl group has larvicidal activity and may be used in premises or pastures infected with horse-strongyles or other members of the strongylidae family, for example hookworms, trichostrongylidae or metastrongylidae. For this purpose the compound may be formulated either as a suspension of the free base in an aqueous vehicle or as an aqueous solution of a suitable acid addition salt, for example the hydrochloride salt. In either case the amount of active ingredient present may be within the range of from 0.01 to 0.0005 mole per litre.

Some of the compounds of this invention have also activity against adult worms of the oxyuridae family, for example Syphacia obvelata and Aspiculuris tetraptera. One example of such an active compound is 3-N(N'-phenylpiperazino)-2'-hydroxyacrylophenone of Formula I, in which R and R¹ together represent the N¹-phenyl-piperazino group. Such compounds may be formulated with suitable excipients in the form of tablets or capsules for oral administration, and may be administered in single or divided doses of from 100–500 mg. of the active ingredient.

Other compounds of this invention, for example, the compound 3-(N-morpholino)-2'-hydroxyacrylophenone, possess trichomonicidal activity against Trichomonas vaginalis and are trichomonicidal agents.

As such, they may be formulated with suitable excipients in the form of vaginal suppositories or vaginal inserts containing from 50 mg. to 500 mg. of the active ingredients, and may be administered twice daily for periods of time of from two to several weeks.

Most specifically, the compounds of this invention are prepared by heating together substantially equimolar amounts of 2-formyl-2'-hydroxyacetophenone prepared as described by Schönberg et al. in J. Am. Chem. Soc., vol. 72, p. 3397 (1950), and the appropriate primary or secondary amine, isolating the reaction product, and purifying it by recrystallization.

The following formulae, in which R and R¹ have the significance defined above, and examples will illustrate this invention. The composition of all compounds are confirmed by elemental analysis.

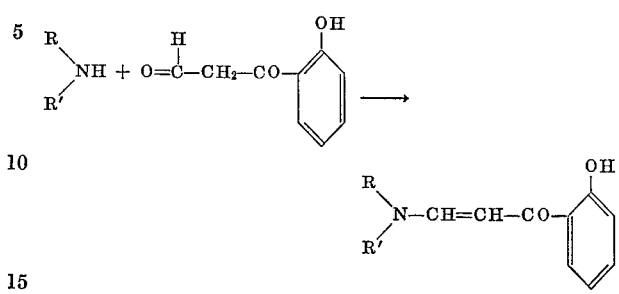

Example 1.—3-(N-aminopiperidino)-2'-hydroxyacrylophenone 2-formyl-2'-hydroxyacetophenone (3.0 g., 0.018 mole) and 1.8 g. (0.018 M) of N-aminopiperidine are heated together for one hour. Crystals are obtained from the reaction mixture upon cooling and are recrystallized from ethanol to give the title compound with M.P. 88–91° C., raised by sublimation to M.P. 91–92° C.

Example 2.—3-N(2-pyridylamino)-2'-hydroxyacrylophenone

A mixture of 3.0 g. (0.018 mole) of 2-formyl-2'-hydroxyacetophenone and 1.7 g. (0.018 mole) of 2-aminopyridine is heated on a steam bath for one-half hour. The crystals which separate upon cooling are recrystallized from ethanol and water and further purified by sublimation to yield the title compound with M.P. 127–127.5° C.

Example 3.—3-N(3-pyridylmethylamino)-2' hydroxyacrylophenone

A mixture of 2-formyl-2'-hydroxyacetophenone (6.0 g., 0.036 mole) and 3-aminomethylpyridine (3.9 g., 0.036 mole) is kept on a steam bath for one hour. A solid separates upon cooling and is crystallized twice from ethanol and water, to yield the title compound with M.P. 110–111° C.

Example 4.—3-N-(N'-phenylpiperazino)-2'-hydroxyacrylophenone

A mixture of 2-formyl-2'-hydroxyacetophenone (3.0 g., 0.018 mole) and N-phenylpiperazine (2.9 g., 0.018 mole) is heated on a steam bath for one hour. The crude solid which separated upon cooling is recrystallized from ethanol-water to yield the title compound with M.P. 114–115° C.

Example 5.—3-(N-morpholino)-2'-hydroxyacrylophenone

A mixture of 2-formyl-2'-hydroxyacetophenone (3.0 g., 0.018 mole) and morpholine (1.6 g., 0.018 mole) is heated on a steam bath for one hour. The crude solid which separates upon cooling is crystallized from ethanol to yield the title compound with M.P. 107–108° C.

We claim:
1. A compound of the formula

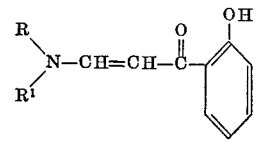

wherein that portion of the molecule designated by

is selected from the following: R is hydrogen and R¹ is selected from the group which consists of pyridyl and pyridylmethyl groups; and R and R¹ together with the nitrogen are selected from the group which consists of N'-phenylpiperazine and N-morpholino.

2. 3-(N-aminopiperidino)-2'-hydroxyacrylophenone, as claimed in claim 1.

3. 3-N(2-pyridylamino) - 2' - hydroxyacrylophenone as claimed in claim 1.

4. 3 - N(3 - pyridylmethylamino) - 2' - hydroxyacrylophenone, as claimed in claim 1.

5. 3-N - (N' - phenylpiperazino) - 2' - hydroxyacrylophenone, as claimed in claim 1.

6. 3-(N - morpholino) - 2' - hydroxyacrylophenone, as claimed in claim 1.

References Cited

Hager et al.: J. Am. Pharm. Assoc., vol. 44, pages 138 to 141 (1955).

JOHN D. RANDOLPH, *Primary Examiner.*